Oct. 21, 1969     A. E. JOSLIN     3,473,359
GROOVING DEVICE
Filed May 22, 1967     2 Sheets-Sheet 1
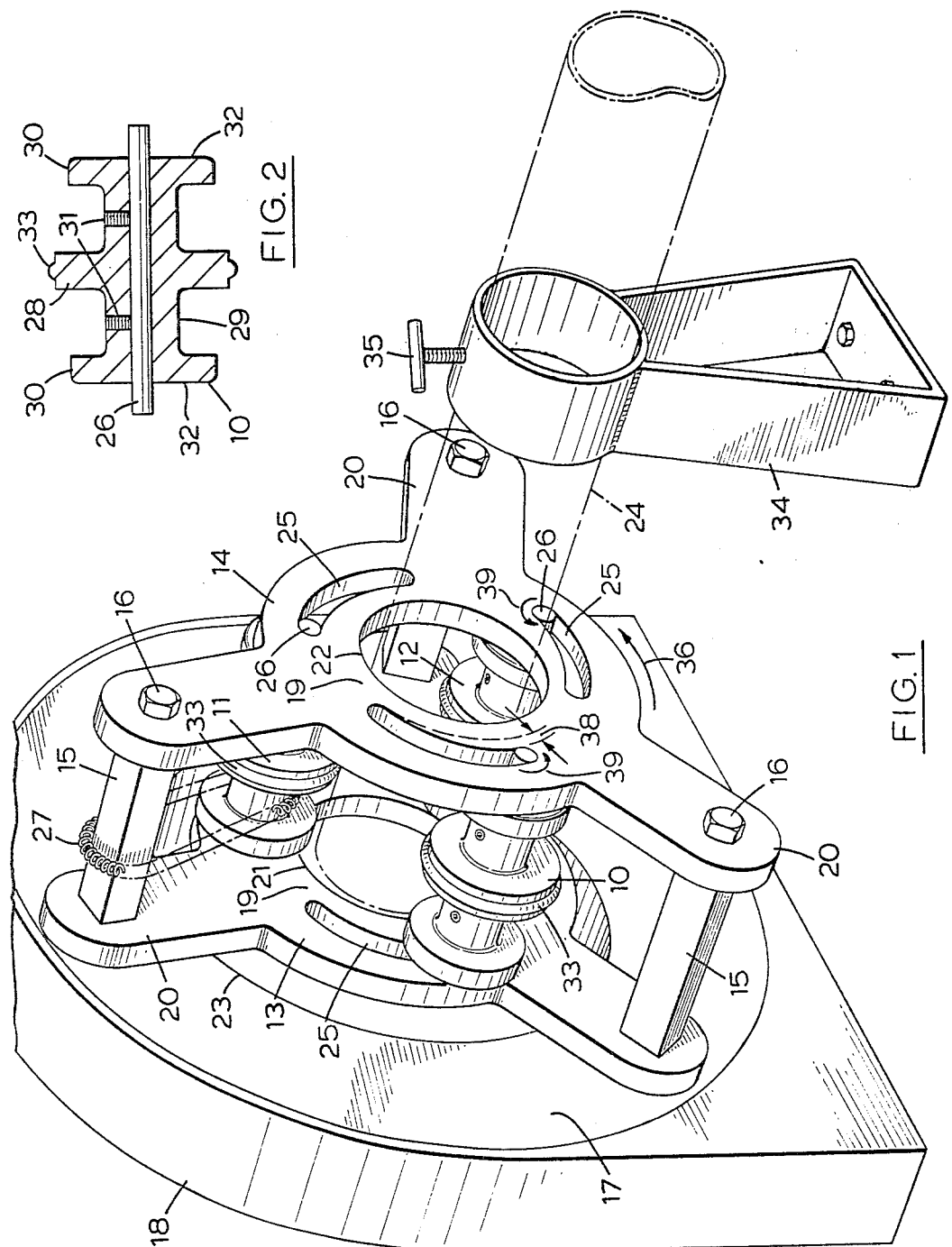
INVENTOR
ALVIN EARL JOSLIN
BY Maybee & Legris
ATTORNEYS Oct. 21, 1969  A. E. JOSLIN  3,473,359
GROOVING DEVICE Filed May 22, 1967  2 Sheets-Sheet 2

INVENTOR
ALVIN EARL JOSLIN
BY Maybee & Legris
ATTORNEYS

United States Patent Office 3,473,359
Patented Oct. 21, 1969

3,473,359
GROOVING DEVICE
Alvin Earl Joslin, 1559 Elite Drive,
Clarkson, Ontario, Canada
Filed May 22, 1967, Ser. No. 640,129
Int. Cl. B21d 17/04
U.S. Cl. 72—121    8 Claims

ABSTRACT OF THE DISCLOSURE

A device for forming an annular groove on a pipe using three rollers having central wheel portions with peripheral groove forming portions thereon and rotatably mounted in a pair of support plates. Each roller has an integrally attached axle, the ends of which are rotatably carried in paired slots in the support plates, along which the axle is free to move. The support plates are attached to a rotatable supporting frame and the plates and frame have a pipe receiving aperture through the centre thereof. The slots diverge from the rotational centre line in the direction of rotation.

BACKGROUND OF THE INVENTION

One of the problems which has always beset the pipe art has been the joining of lengths of pipe which has involved the use of extra joining sections and considerable expense for the material of these sections and the labour for installing the same. If screwed on sections are used extra time and effort must be put into the threading of pipe and if clamped on sections are used installation of the clamping devices is necessary. Often there are problems involved in improper seals and mechanical failures with pipe joints used in the prior art.

In United States Patents No. 3,208,136 and No. 3,210,102 of the present inventor a method of joining pipe and a pipe coupling resulting therefrom are described by which pipes may be joined without the use of any extra joining section. The joint obtained is exceedingly strong, has been found to be substantially free from mechanical failures and provides a leak-proof pressure seal. A problem area with respect to the joining method and pipe coupling disclosed in this patent has been in the forming of an annular groove on the male pipe end which makes up part of the coupling formed. Thus, forming of the groove in relatively thin-walled pipe has been a relatively easy process, but the grooving of thick-walled pipe has proven to be more difficult, with the use of ordinary grooving tools.

SUMMARY

In accordance with the invention a grooving device for thick- and thin-walled metal pipes is provided which uses a series of rollers peripherally located around the pipe which quickly and easily roll an annular groove thereinto. The grooving device has two support plates integrally attached together in spaced relationship with one of the plates being integrally attached in turn to a rotatably driven supporting frame. The plates and frame have aligned apertures through their centres for admission of pipes to be grooved therethrough, the apertures being located on the rotational centre line of the rotating frame and plates. Three arcuate slots of equal length are located in each support plate and the slots are aligned in opposed pairs in the two plates. Furthermore, the slots are arranged in each plate to be equidistant from the rotational centre line and to gradually diverge in the direction of rotation of the frame and plates. A grooving roller with a fixed axle extending on each side thereof is mounted in each pair of opposing slots with the axle rotatably supported in and free to move along the opposing slots. Two of the rollers are biased to hold the axles thereof in the ends of the slots furthest from the rotational centre line before the commencement of a grooving operation. Each of the rollers has a central wheel portion with a hard peripheral groove-forming portion located thereon. All of the groove-forming portions on the grooving rollers are located and retained in a common plane perpendicular to the rotational centre line to allow formation of a single annular groove on any pipe being worked upon.

It is an object of the invention to provide a novel grooving device for metal pipe which quickly and easily rolls an annular groove in pipes of both thick and thin-walled section.

Other objects and advantages of the invention will be apparent from the following description taken in conjunction with the accompanying drawing.

BRIEF DESCRIPTION OF THE DRAWING

FIG. 1 is a perspective view of a grooving device embodying the present invention;

FIG. 2 is a sectional view of one of the grooving rollers shown in FIG. 1; and

DESCRIPTION OF THE PREFERRED EMBODIMENTS

Figure 3:
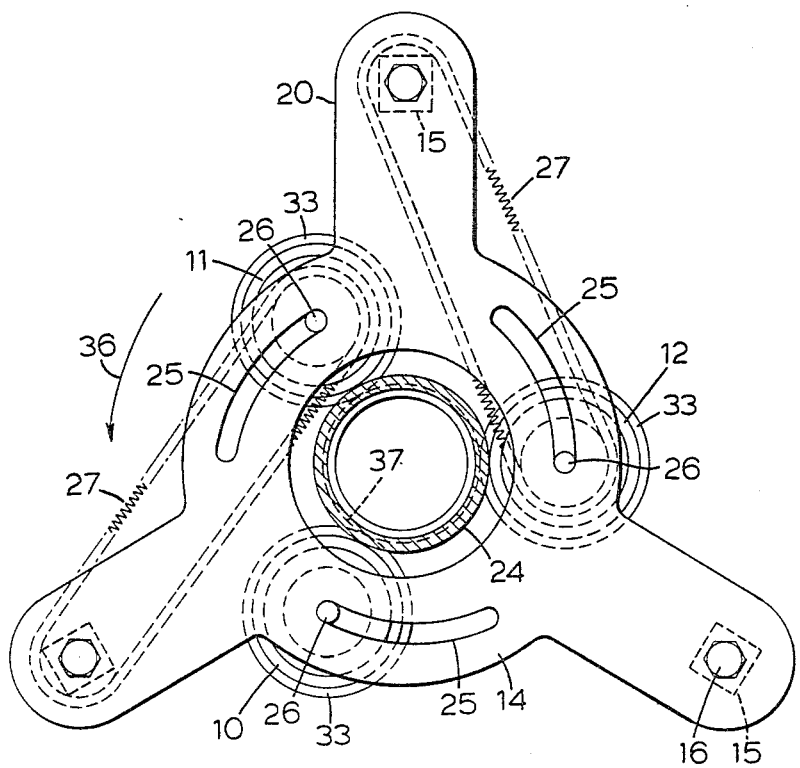
FIG. 3 is an elevational view on the open end of the grooving device shown in FIG. 1 at the end of a grooving cycle and with a pipe located within the groover.

Referring now to the drawing, and in particular to FIG. 1, in a perspective view of a grooving device embodying the invention, three grooving rollers 10, 11, 12 are shown rotatably mounted between two substantially parallel support plates 13, 14. The support plates 13, 14 are integrally attached together in spaced relationship by way of connecting rods 15 and retaining screws 16 (shown only on support plate 14) located at the outer extremities of the plates 13, 14. A rotatably driven supporting frame 17, advantageously of annular ring configuration as shown in FIG. 1, is shown integrally attached to the support plate 13. The supporting frame 17 is shown located in housing 18 and is rotatably driven by any convenient means well known to the art. Thus the frame 17 may be rotated by a pulley drive mechanism and the frame 17 may be in the form of a ring with an inner gear machined thereon in which case the frame 17 may be rotatably driven by a pinion and gear drive mechanism. Driving of the frame 17 of course causes rotation of the support plates 13, 14 with annular rotation of the grooving rollers 10, 11, 12 about the rotational centre line of the rotatably driven plates 13, 14 and frame 17 resulting therefrom.

The support plates 13, 14 are advantageously shaped as shown in FIG. 1 with an annular central section 19 with slots therein and three radial arms 20 projecting therefrom for reception of the retaining screws 16 and joined by the connecting rods 15, weight and material savings resulting from such a shape. The plates 13, 14 and the frame 17 have aligned apertures 21, 22, 23, respectively, located through the centre thereof for admission of circular pipes therethrough, such as pipe 24, shown in dotted outline projecting into the grooving device and through the apertures 21, 22. The apertures 21, 22, 23 are centred generally on the rotational centre line of the plates 13, 14 and the frame 17, i.e., on the rotational centre line of the grooving device. Three arcuate slots 25 of substantially equal length are shown located in the annular section 19 of each of the plates 13, 14 (only one slot being shown in the plate 13) and the slots 25 are advantageously cut through the plates 13, 14 as shown for ease of manufacture, although they may project only into the inside of each plate 13, 14 and not completely therethrough. The three slots 25 in one plate are located in opposing paired relationship with the three slots 25 in the other plate as shown and the slots 25 are arranged in each plate around the apertures 21, 22 so as to be substantially equidistant from the rotational centre line of the grooving device. The slots 25 are also arranged to gradually and smoothly diverge in the direction of rotation of the grooving device.

The grooving rollers 10, 11, 12 are each mounted in a pair of the opposing slots 25 in the plates 13, 14 by way of axles 26 which are integrally attached to and extend from each end of the rollers. The axles 26 are rotatably and freely supported in the slots 25, being free to move along the slots. Two of the rollers 11, 12 are biased so as to maintain the axles thereof in the ends of the slots 25 farthest from the rotational centre line of the grooving device before the commencement of a grooving operation. Advantageously, the rollers are biased to this end of the slots 25 by way of looped tensioned return springs 27 (one only being shown in connection with the roller 11) each of which has one end around one of the connecting rods 15 and the other end around the roller, the spring being stretched therebetween. The roller 10 has no return spring connected thereto and is unrestrained in the slots 25.

Referring to FIG. 2, which shows a sectional view along the length of any one of the grooving rollers 10, 11, 12, each roller is seen to have a central circular wheel portion 28 thereon located on a hub 29 and shoulder portions 30 at each end of the hub 29. The hub 29 is seen to be integrally attached to the axle 26 by way of set screws 31. The shoulder portions 30 have substantially flat portions 32 adjoining the inside of the plates 13, 14. The length of the rollers 10, 11, 12 along their rotational centre lines is only slightly less than the distance between the parallel plates 13, 14 to just allow free movement of the rollers along the slots 25 between the plates. The flat portions 32 on the shoulders 30 serve to keep the rollers 10, 11, 12 properly aligned in the slots 25 with their axles substantially parallel to the rotational centre line of the grooving device. The wheel portions 28 have peripheral groove-forming portions 33 thereon, made from a very hard material such as tungsten carbide, and these peripheral portions act to roll a groove into a pipe being worked upon. The groove-forming portions 33 on the grooving rollers are located and retained in a common plane, perpendicular to the rotational centre line of the grooving device, to allow the formation of a single annular groove in a metal pipe being treated.

In operation the pipe 24 being grooved (shown in broken line in FIG. 1) is inserted through the aperture 22 and between the rollers 10, 11, 12 in a grooving device wherein there is just slight clearance for the pipe to allow easy insertion thereof. A pipe guide support 34, located some distance from the grooving device along the rotational centre line thereof is utilized as shown in FIG. 1 and the pipe is made immovable by way of clamp 35. The pipe is inserted to rest on the lower roller or rollers and to position the pipe so that the groove to be made therein is properly located. Driving force is then supplied to the rotatable supporting frame 17 and as the grooving device starts to rotate the free roller 10 eventually falls in the slots 25 by force of gravity and binds against the pipe 24, thus initiating a binding contact between the pipe and all three rollers. As rotation continues in the direction of arrow 36 the rollers rotate in the same direction by virtue of their contact with the stationary pipe 24. At the same time the axles 26 of the rollers are thrown out against the outer edge of the slots 25 and as the axles rotate in the direction of arrows 39 they gradually move along the slots 25 and inwardly towards the rotational centre of the groover.

As the rollers bind more and more on the pipe 24 and move slowly inwardly a groove is slowly rolled into the pipe by the hard peripheral portions 33 and the full depth of groove is reached when the axles 26 of the rollers reach the ends of the slots 25 located closest to the rotational centre line of the groover. FIG. 3 shows an end elevational view of the groover, looking at the plate 14, with the groover at the end of a full grooving stroke after being rotated in the direction of the arrow 36 and with the pipe 24 being grooved shown in section. The groover has been rotated until the axles 26 have moved along the slots 25 to the ends thereof closest to the pipe 24, with the rollers gradually grooving the pipe more deeply. The grooving wheels of the grooving rollers 10, 11, 12 are shown rolled some distance into the pipe with the bottom of the groove formed shown by broken lines 37. The tensioned return springs 27 are shown on the rollers 11, 12, ready to return these rollers to the outside end of the slots 25 when the groover has stopped rotating. After rotation has stopped and the rollers 11, 12 has been pulled back the clamp 35 is released and the grooved pipe is removed.

It is to be noted that the depth of groove made by any particular groover is the same as distance 38 (shown in FIG. 1) which slots 25 converge towards the rotational centre of the groover. Thus, the depth of groove can be varied by changing the distance of slot convergence on a groover. With any one groover smaller or larger pipes can be grooved by replacing the grooving rollers with larger and small rollers as required. This is accomplished by merely removing the support plate 14. Alternatively, smaller or larger support plates can be used with the guide slots 25 located nearer or farther from the rotational centre line and with smaller or larger apertures therein for reception of pipes therethrough.

It is found that the grooving device of the present invention easily and quickly grooves not only thin-walled pipe but substantially thick-walled pipe which has heretofore been most difficult to groove with simple grooving tools known to the art.

What I claim as my invention is:

1. A grooving device for a metal pipe comprising two substantially parallel support plates integrally attached together at outer extremities thereof in spaced relationship, a rotatably driven supporting frame for and integrally attached to one of said support plates, said support plates and supporting frame having aligned apertures through the centre thereof for admission of circular pipes therethrough, the apertures being located on the rotational centre line of said rotatably driven frame and plates, three arcuate slots of substantially equal length in and through each of said support plates, said slots being located in opposing paired relationship in the two plates, said slots being arranged in each plate around said apertures substantially equidistant from said rotational centre line and also being arranged to gradually and smoothly diverge in the direction of rotation of said frame and plates, and a grooving roller mounted in each pair of opposing slots in said plates having an axle thereon integrally attached thereto and extending on each side of said roller, each of said axles being rotatably supported in and being free to move along a pair of opposing slots, two of said grooving rollers being biased to maintain the axles thereof in the ends of the slots farthest from said rotational centre line before the commencement of a grooving operation, and each of said rollers having central wheel portions with hard peripheral groove-forming portions thereon, all of said groove-forming portions being located and retained in a common plane perpendicular to said rotational centre line to allow formation of a single annular groove in a metal pipe being grooved in said grooving device.

2. A grooving device as claimed in claim 1 wherein the two grooving rollers biased to hold the axles thereof in the ends of the slots farthest from the rotational centre line are each biased by way of a looped tensioned spring located around the roller.

3. A grooving device as claimed in claim 1 wherein the rotatably driven supporting frame is in the form of a ring.

4. A grooving device as claimed in claim 1 wherein the two support plates have annular central sections with the arcuate slots therein and three radial arms projecting outwardly therefrom and the two plates are integrally connected together by connecting rods joining paired radial arms of each plate.

5. A grooving device as claimed in claim 1 wherein the two grooving rollers biased to hold the axle thereof in the ends of the slots farthest from the rotaitonal centre line are each biased by way of a looped tensioned spring located around and stretched between the roller and connecting rod joining the support plates.

6. A grooving device as claimed in claim 1 wherein the length of the rollers is only slightly less than the distance between the plates to just allow free movement of the rollers between the plates and of the axles of the rollers along the slots.

7. A grooving device as claimed in claim 6 wherein the grooving rollers have shoulder portions at each end thereof with substantially flat portions thereon adjoining and parallel to the support plates to maintain alignment of the rollers and retain the groove forming portions perpendicular to the rotational centre line.

8. A grooving device for a metal pipe comprising two substantially parallel support plates integrally attached together at outer extremities thereof in spaced relationship by way of connecting rods therebtween, a rotatably driven supporting frame for and attached integrally to one of said support plates, said support plates and supporting frame having aligned apertures through the centre thereof for admission of circular pipes therethrough, the apertures being located on the rotational centre line of said rotatably driven frame and plates, three arcuate slots of substantially equal length in and through each of said support plates, said slots being located in opposing paired relationship in the two plates, said slots being arranged in each plate around said apertures substantially equidistant from said rotational centre line and also being arranged rotation of said frame and plates, and a grooving roller mounted in each pair of opposing slots in said plates having an axle thereon integrally attached thereto and extending on each side of said roller, each of said axles being rotatably supported in and being free to move along a pair of opposing slots, the length of each roller being only slightly less than the distance between the plates to just allow free movement of the rollers between the plates and of the axles of the rollers along the slots, two of said grooving rollers each being biased by a looped tensioned spring to maintain the axles thereof in the ends of the slots farthest from said rotational centre line before the commencement of a grooving operation, each looped tensioned spring being located around and stretched between one of the rollers and one of the connecting rods joining the support plates, and each of said rollers having central wheel portions with hard peripheral groove-forming portions thereon and having shoulder portions at each end thereof with flat portions thereon adjoining and parallel to the support plates to maintain alignment of the rollers and retain the groove-forming portions in a common plane perpendicular to said rotational centre line to allow formation of a single annular groove in a metal pipe being grooved in said grooving device.

References Cited
UNITED STATES PATENTS

| | | | |
|---|---|---|---|
| 3,149,511 | 9/1964 | Warren | 72—121 |
| 2,684,102 | 7/1954 | Clerke | 72—123 |
| 3,352,139 | 11/1967 | Cummings | 72—121 |
| 2,481,514 | 9/1949 | Ingemarson | 72—123 |

RICHARD J. HERBST, Primary Examiner

A. L. HAVIS, Assistant Examiner

U.S. Cl. X.R.

10—89; 29—97; 72—123